(12) United States Patent
Cromer et al.

(10) Patent No.: US 6,353,854 B1
(45) Date of Patent: Mar. 5, 2002

(54) AUTOMATIC RECONFIGURATION SYSTEM FOR CHANGE IN MANAGEMENT SERVERS HAVING PROTOCOL DESTINATION ADDRESSES

(75) Inventors: Daryl Carvis Cromer, Cary; Brandon John Ellison, Raleigh; Eric Richard Kern, Durham; Howard Jeffrey Locker, Cary; James Peter Ward, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/164,657

(22) Filed: Oct. 1, 1998

(51) Int. Cl.⁷ .............................................. G06F 15/173
(52) U.S. Cl. ........................... 709/224; 709/220; 714/4
(58) Field of Search .................................. 709/224, 220, 709/221, 230; 714/4, 31

(56) References Cited

U.S. PATENT DOCUMENTS

| | | | | |
|---|---|---|---|---|
| 4,750,175 A | * | 6/1988 | Brenneman et al. | 371/22 |
| 5,305,321 A | * | 4/1994 | Crayford | 370/94.1 |
| 5,404,544 A | * | 4/1995 | Crayford | 395/750 |
| 5,594,426 A | * | 1/1997 | Ushijima et al. | 340/825.02 |
| 5,650,800 A | * | 7/1997 | Benson | 345/173 |
| 5,815,652 A | * | 9/1998 | Ote | 395/183.07 |
| 5,892,690 A | * | 4/1999 | Boatman et al. | 364/528.11 |
| 5,905,867 A | * | 5/1999 | Giorgio | 709/224 |
| 6,249,812 B1 | * | 6/2001 | Cromer et al. | 709/221 |

\* cited by examiner

Primary Examiner—Zarni Maung
(74) Attorney, Agent, or Firm—J. Bruce Schelkopf

(57) ABSTRACT

A client on a network is provided with auxiliary low power logic, at the network adaptor, that is always active and simulates network traffic (e.g., Ethernet format) normally sent under control of the main client system processor(s). This logic collects client status information and reports to the network manager, even when the system CPU is powered down, information which allows the network manager to exercise broader control and perform maintenance and upgrades which would otherwise require a dialog with the user and/or limit maintenance and reconfiguration of the client system to off-hours activity.

14 Claims, 6 Drawing Sheets

OLD SERVER IP - 4 BYTES
OLD SERVER MAC - 6 BYTES
OLD UDP PORT - 2 BYTES

SYSTEM KEY - 16 BYTES
GROUP KEY - 16 BYTES
NEW SERVER IP - 4 BYTES
NEW SERVER MAC - 6 BYTES
NEW UDP PORT - 2 BYTES

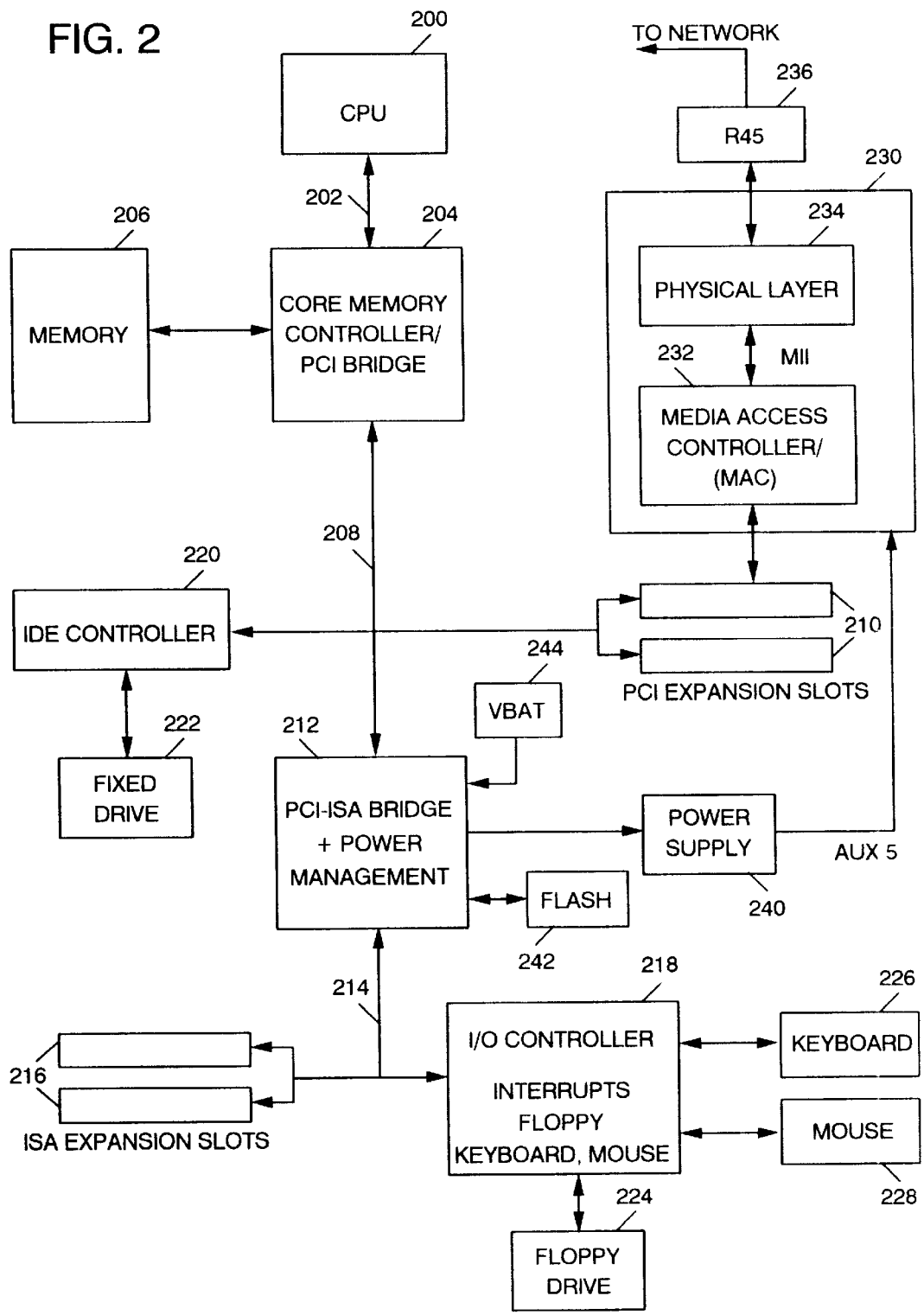

AUTOMATIC RECONFIGURATION SYSTEM FOR CHANGE IN MANAGEMENT SERVERS HAVING PROTOCOL DESTINATION ADDRESSES

BACKGROUND OF THE INVENTION

1. Field of the Invention

The present invention relates to computer systems coupled to a network and more particularly to a system having logic to receive transmissions across a connection to a network to allow for automatically updating configuration information and system management parameters.

2. Description of Related Art

Personal computer systems are well known in the art. Personal computer systems have attained widespread use for providing computer power to many segments of modem society. A personal computer (PC) can typically be defined as a desktop, floor standing, or portable microcomputer that includes a system unit having a single central processing unit (CPU) and associated volatile and non-volatile memory, including random access memory (RAM) and basic input-output system read only memory (BIOS ROM), a system monitor, a keyboard, one or more flexible diskette drives, a CD-ROM drive, a fixed disk storage drive (also known as a "hard drive"), a "mouse" or pointing device, and an optional network interface adapter. One of the distinguishing characteristics of such a system is the use of a motherboard or system planar to electrically or operationally connect these components together. Examples of such PCS are computer systems within IBM's PC 300 series and IBM's IntelliStation Series. The PC of the before referenced related patent document Serial No. 104835 identified in the illustration of FIG. 3 thereof and as described in the patent document specification thereof, is an example of a typical client computer system.

With PCS being increasingly connected into networks to allow transfers of data among computers, more operations such as maintenance, updating of applications and data collections are occurring over the network. As computers are also becoming more and more essential to their users, it is desirable to minimize loss of productivity by increasing the availability of PCS. This includes detection and reporting of intermittent failures on a system that will allow system administrators to schedule maintenance for the PC at a convenient time. In addition, the immediate detection and reporting of an inoperable PC is required, since it has an immediate impact to productivity. There is no reason to wait until employees arrive on the next working day to discover that the machine failed yesterday or over the weekend.

One solution to this problem has been alert technology, such as IBM's Alert on LAN technology, which supports detection and reporting of failures over a network. Alert on LAN solution creates network alerts to provide event and status information to a network administrator. The technology detects and reports events such as operating system (OS) hang, POST/BIOS error codes, and voltage and temperature problems.

When the client systems are deployed, the network administrator must configure the alerts supported and the TCP/IP Internet Protocol (IP) information for the administrator's management console. This information is then stored in a non-volatile EEPROM in the client system.

It is normal to custom configure the system unit of a computer system for a user at a corporate configuration center or at the user site. When done at a configuration center the resources and skills needed are available, but the computer must be removed from the packaging, set up, configured with BIOS and a program image, and configured to support system management applications such as Alert on LAN and then repackaged to be sent to the end user. At the time of configuration, the final location or owner of the system may not be known. Therefore at the time of configuration the IP address of management server is not possible, given that most networks have several management consoles. The missing critical pieces of information will require re-configuration at the final location.

At the user site, roll out and updating of systems is a less efficient use of resources but avoids the determining-final-location problem. For complex system management program images, it may be necessary to send out a skilled configuration expert thus consuming time when the expert's valuable skills could otherwise be put to use, as the expert travels to the user site.

Accordingly, a number of methods have been developed for simplifying the remote configuration of computer systems. For example, the Desktop Management Interface (DMI) industry standard provides a mechanism to retrieve and update remotely from a client personal computer. The DMI technology is widely used in standard system management applications such as Intel's LANDesk programs and IBM's NetFinity program.

The task of re-configuring IP headers using DMI is accomplished by the following steps. First the management server must discover all the systems on the network. The management server can only do first time discovery of systems on the network if they are in full power on state running OS with a management application with DMI capabilities such as Intel's LANDesk Client Manger or IBM NetFinity. After the system is discovered it is placed into a database. Next the systems must be placed in a full-on power state, since DMI runs on the OS. This may be accomplished using Wake on LAN technology. Finally DMI is used to re-configure the IP header by sending commands to the Alert on LAN management application. This is a complicated and time consuming operation, given that several hundred machines are set up to send alerts to a single server. This mechanism also requires the system administrator to gain control of each system to accomplish the update.

The time required to update each system unfortunately provides an opportunity for loss of information, since information sent by a client, prior to being reconfigured to the new server, is lost. There is a potential significant down-time when there is a change in server due to a crash or network issue. Each client system must be reconfigured with the IP address of the new management server. In the case of routine maintenance, it is possible to avoid loss of information, but the reconfiguration process is very time consuming and potentially disruptive to operation on the client.

What is needed is a robust and effective mechanism to update the destination IP address in the client PCS to point to the new server. The present invention provides for such a mechanism and will update the IP address regardless of the power state, i.e., full-on, sleep, or off, of the client. In addition, the mechanism provides for an advantageous method for handling updates to groups of systems within a network.

SUMMARY OF THE INVENTION

The present invention recognizes that by designing improved hardware reception capabilities in the computer. It is possible to reconfigure a system unit at a remote location without requiring DMI. The invention involves the recognition that a system normally, and for good reason, protects itself from being re-configured remotely, and it is desirable to override these protections and have the computer automatically reconfigure based on a special packet from a management console.

One embodiment of the present invention is directed to a method for detecting re-configuration packets from a management console and then updating hardware configuration. The system, when necessary, is supplied with auxiliary power and is operative to receive and accept updates regardless of the system power state. The method includes providing a computer system connected to a management console via a data transmission network. The invention includes a detection scheme to recognize re-configuration network packets. The invention further includes a scheme for the computer to handle re-configuration of sub-groups of machines.

The present invention recognizes that certain normal reconfiguration operations, that involve updating operations as opposed to initialization operations, are minor operations but nonetheless are expensive and time consuming because, for example, a service person must come to the site or use a time consuming process, such as employing DMI techniques, to make the desired changes. By so modifying the re-configuration process, the PCS can be controlled based on predefined network commands without requiring software intervention. Such "hardware" modifications can be performed by the network administrator without requiring a service call.

While remote wake-up of client systems has made the network manager's support of client systems more convenient, it is limited in that it requires software applications running at the client for maintenance operations or updates. Related patent application Ser. No. 09/024,231 describes logic for responding to status information queries from a main computer over the network.

According to the present invention, included is an auxiliary processor that communicates with the network adapter and is always "on" as a result of trickle power, and it receives commands through a connection to the network through a portion of the network adapter, which is also trickle powered to always be "on." The auxiliary processor listens for occasional signals, in network format, from the management console indicating a re-configuration request for action on the client. This allows the network manager to perform operations without a time consuming operation of reconfiguration which occurs using, for example, DMI or making a service call. Hence while there is a service call normally required to change IP settings, the auxiliary processor provides the ability to selectively reconfigure hardware according to the invention, which results in making remote maintenance more effective.

According to a preferred implementation, the signals are introduced to the network side of the "physical layer" of the network controller. The physical layer is the layer that provides the mechanical, electrical, functional and procedural means to establish, maintain and release physical connections over the transmission medium and it conditions the packet signal to analog form to send and receive over the physical connecting network that is the LAN. By so configuring the packet to have the characteristics of a standard packet, it passes through the network as if a normal packet is received by the client.

It is recognized, by the invention, that additional commands and other information are to be received from the network manager to provide increased remote maintenance support, but that it is not desirable to change from existing PC network structures and protocols and the major installed infrastructure of PC networks. According to the invention, low power logic is provided that is always active and simulates normal network data traffic (e.g., Ethernet format) normally sent from and received by the client system.

The PC stays active, preferably full time, and is able, on an ongoing basis, at a minimum, to monitor the network scanning for re-configuration packets. By so maintaining the ability to respond immediately to changes in management consoles at the client, the network manager is made aware of the actual conditions at the client without loss of information due to a network circumstance or change in management consoles. A problem can be addressed while the machine is unattended and possibly before the user realizes a problem exists.

BRIEF DESCRIPTION OF THE DRAWINGS

FIG. 2 is a block diagram of a system client with network connection circuitry without the benefit of the present invention;

DETAILED DESCRIPTION OF THE INVENTION

While the present invention is described more fully hereinafter with reference to the accompanying drawings, in which a preferred embodiment and exemplary illustrations of the present invention is shown, it is to be understood, that with regard to the description of the specification and figures, that persons of ordinary skill in the appropriate arts may modify the invention herein described while still achieving the favorable results of this invention. Accordingly, the description which follows is to be understood as being a broad teaching disclosure directed to persons of ordinary skill in the appropriate arts, and not as limiting upon the present invention.

Figure 1:
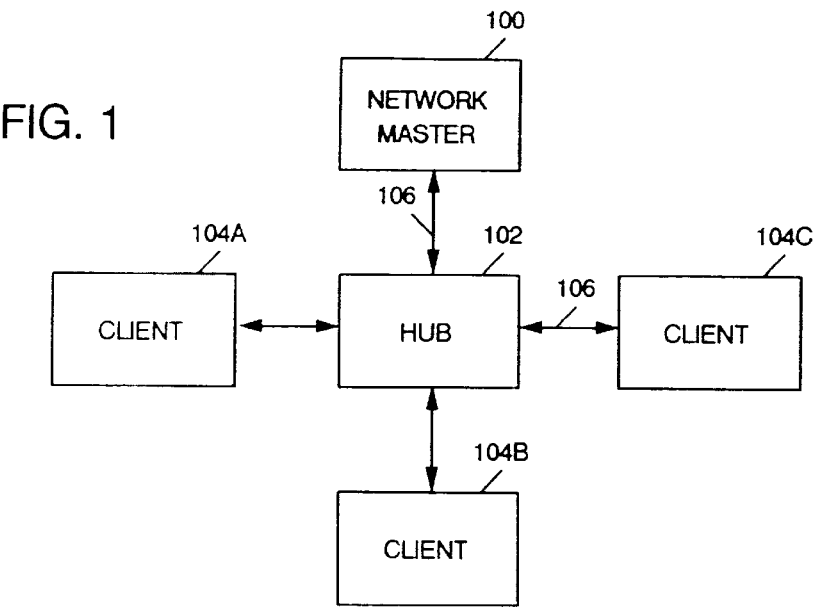
FIG. 1 is a block diagram of a network arrangement suitable for implementation of the present invention.

Referring to FIG. 1, a network master 100, hereinafter sometimes referred to as management console, is connected to a hub 102 by a LAN connector bus 106. Respective client stations or systems 104, illustrated as exemplary systems 104A, 104B and 104C, are also connected to the hub 102 through respective LAN busses 106. The preferred illustrated and exemplary form of network conforms to the Ethernet specification and uses such hubs. It will be appreciated however that other forms of networks, such as, but not limited to, Token-Ring are applicable to the present invention.

A computer system suitable for use as a client station 104 to embody the present invention is indicated in FIG. 2. A central processing unit (CPU) 200 is connected by address, control and data busses 202 to a memory controller and PCI bus bridge chip 204. System memory 206 is connected to the memory controller 204. Connected to standard PCI expansion bus 208 are the memory controller PCI bridge chip 204, IDE device controller 220, PCI connector slots 210, and a PCI bus to ISA bus bridge chip 212 which typically also includes power management logic. ISA standard expansion bus 214 with ISA expansion connector slots 216 is connected to bridge chip 212. It will be appreciated that other expansion bus types may be used to permit expansion of the system with added devices and it is not necessary to have two expansion busses.

In an intelligent client station 104 there would normally be input devices and data storage devices such as a fixed and a floppy drive 222 and 224, respectively. The fixed drive 222 is connected to IDE controller 220, whereas the floppy drive 224 is connected to I/O controller 218.

PCI-ISA bridge controller 212 includes an interface for Flash memory 242, which contains microcode, which the system 104 executes upon power-on. The flash memory 242 is a non-volatile storage device which can be an electrically erasable programmable read only memory (EEPROM) module and includes BIOS that is used to interface between the IO devices and operating system. PCI-ISA bridge controller 212 also contains CMOS which is used to store system configuration data. That is, the CMOS will contain values which describe the present configuration of the system 104. For example, CMOS contains information describing the list of IPL devices set by a user and the sequence to be used for a particular power method, the type of display, the amount of memory, time, date, etc. Furthermore, these data are stored in CMOS whenever a special configuration program, such as configuration/setup is executed. PCI-ISA bridge controller 212 is supplied power from battery 244 to prevent loss of configuration data in CMOS.

A client system 104 has a network adapter 230, which may, for example, be plugged into one of the connector slots 210 or in the alternative could connected to ISA slot 216 or embedded on the planar such as in the video. The client system 104 is shown with a special power supply 240 which supplies full normal system power and has a auxiliary power Aux 5 which supplies full time power to the power management logic 212 and the network adapter 230. This enables the system, as is known, to respond to a wake-up signal from network adapter 230 and power up the system. The network adapter 230 consists of a physical layer 234 and a media access controller (MAC) 232 connected through the MII (media independent interface) local bus. The MAC 232 serves as an interface between a shared data path, i.e., the MII, and the PCI bus 208. The MAC 232 performs a number of functions in the transmission and reception of data packets. For example, during the transmission of data, the MAC 232 assembles the data to be transmitted into a packet with address and error detection fields. Conversely, during the reception of a packet, the MAC 232 disassembles the packet and performs address checking and error detection. In addition, the MAC 232 typically performs encoding/decoding of digital signals transmitted over the shared path and performs preamble generation/removal, as well as bit transmission/reception. As an example, the MAC 232 may be an Intel 82557 chip.

The MII bus is a specification of signals and protocols which formalizes the interfacing of a 10/100 Mbps Ethernet Media Access Controller (MAC) 232 to the underlying physical layer 234. The physical layer 234 conditions analog signals to go out to the network, for example, an Ethernet network over an RJ45 connector 236, as is well known. For example, the physical layer 234 can be a fully integrated device supporting 10 and 100 Mb/s CSMA/CD Ethernet applications. The physical layer 234 receives parallel data from the MII local bus and converts it to serial data for transmission through the connector 236 and over the cable network. The physical layer 234 is also responsible for wave shaping and provides analog voltages to the network. The physical layer can be, for example, an Integrated Circuits Systems chip No. 1890. The physical layer 232 includes auto-negotiation logic that serves three main purposes. First, it determines the capabilities of the main computer, second it advertises its own capabilities to the main computer, and thirdly it establishes a connection with the main computer using the highest performance connection technology. The physical layer 232 also provides a LINK status signal that reflects the current link status. The output of the LINK signal is low when a valid link exists between the system 104 and the main computer 100.

The media access controller (MAC) 232 processes the network signals in digital form and connects to the PCI bus 208. The network adapter 230, it should be appreciated, may be added as an adapter card (as shown) or implemented directly on the system motherboard. To support wake-up operation, in the illustration of FIG. 2, it is powered from the full time auxiliary line Aux 5.

Figure 3:
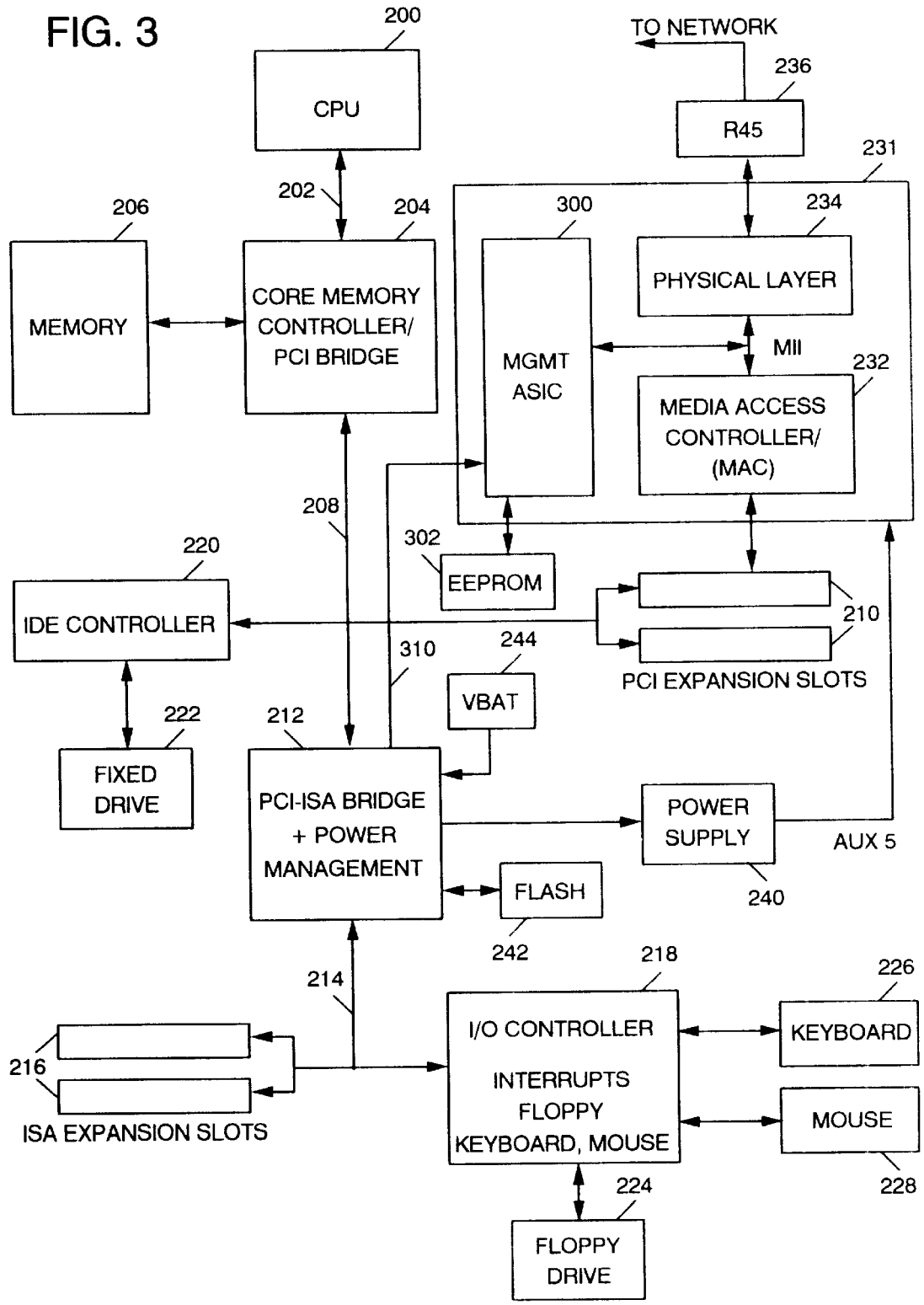
FIG. 3 is a block diagram of a system client with added logic, according to the principles of the present invention, coupled to the network connection circuitry for receiving and executing a command.

The illustrated exemplary client system 104 of FIG. 3 incorporates a specially modified network adapter 231 with a logic module 300, according to the principles of the present invention, connected at the MII bus that extends between the physical layer 234 and the MAC 232. This logic may be a "hard wired" application specific integrated circuit (ASIC) or a programmed general-purpose processor which is programmed as more fully described hereinbelow. By so connecting the logic 300 at the MII bus, it can send and receive network packets using the physical layer 234. The invention is using hardware to handle a very limited number of predefined packets that are created and decoded by hardware. This approach bypasses the software stack and allows the ASIC to send and receive UDP (User Datagram Protocol) datagrams thru the physical layer. The logic 300, according to the invention, accepts data from the physical layer 234 and provides updated configuration information stored in EEPROM 302, a non-volatile memory storage device. With the trickle power supplied on bus Aux 5, of power supply 240, the logic 231 is preferably powered full time. Management ASIC 300 is connected to bridge controller 212 via the System Management (SM) bus 310. This provides a path to allow software running on PC 104 to access the management ASIC 300 and the EEPROM 302. The principles taught could be applied to integrated MAC-PHY solutions such as Intel product device #82558, or integrated MAC-PHY Management ASIC solutions.

Figure 4:
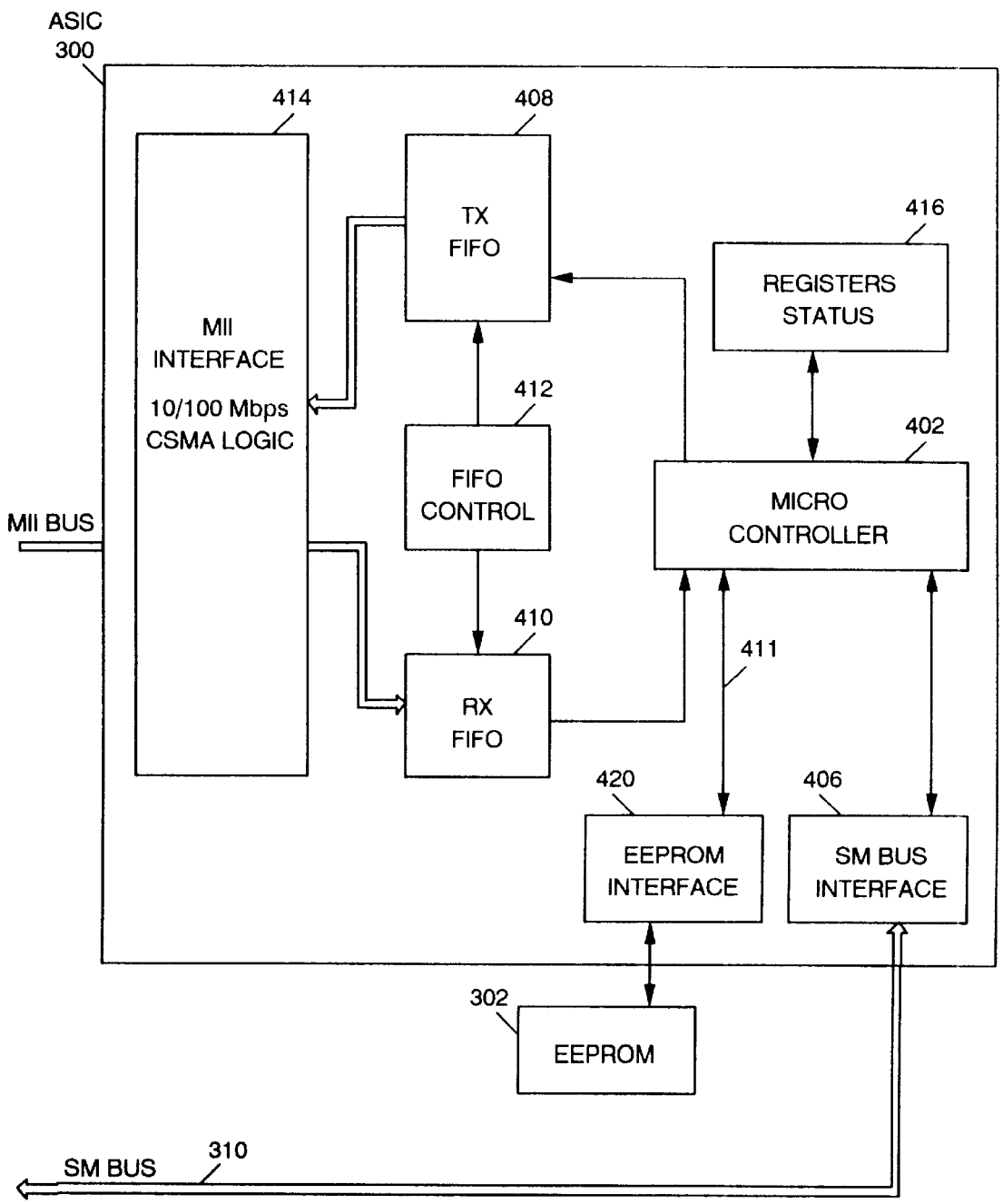
FIG. 4 is a detailed block diagram of the LAN adapter from FIG. 3 and logic for the present invention.

Component modules of the logic module 300 are indicated in FIG. 4. Signals are received from the MII bus by interface unit 414 and passed to RX (reception) FIFO (first-in-first-out) 410. Micro controller 402 coordinates the processing of information according to the principles of the present invention. The micro controller 402 accesses EEPROM 302 through interface control lines 411 to EEPROM interface 420 to obtain values to create network packets such as source and destination MAC address, IP protocol information, authentication headers and Universal Data Packet headers. Furthermore EEPROM 302 retains the universal identifier (UUID) for the client system 104 and the unique system data. UUID stands for Universal Unique Identifier which is a part of Microsoft's PC98 specification and provides a unique number for every PC. The system unique data would be that data which defaults for alerts enabled/disabled, timers for watchdogs and system and group keys for the client PC.

The micro controller 402 consists of several state machines to handle the following tasks: packet reception, packet transmission, SM bus interface transmission and EEPROM updates. The micro controller 402 sends commands to FIFO control 412 to control data flow from TX (transmission) FIFO 408 and RX FIFO 410. Them micro controller 402 also responds to a SM bus 310 request from software running on a PC 104 to access Register Status 416 or access EEPROM 302.

When a network packet is received the micro controller 402 processes the data in the packet according to the invention and determines whether the packet is a standard data packet or a management packet. In the preferred embodiment of the invention, a defined packet is the result of updating with the values in non-volatile EEPROM 302. The micro controller 402 responds to the management console 100 to indicate completion of updates by sending a response message by sending a packet to TX FIFO 408 which transfers the packet to MII bus Interface 414 and then on to physical layer 234 over the MII bus.

Figure 6:
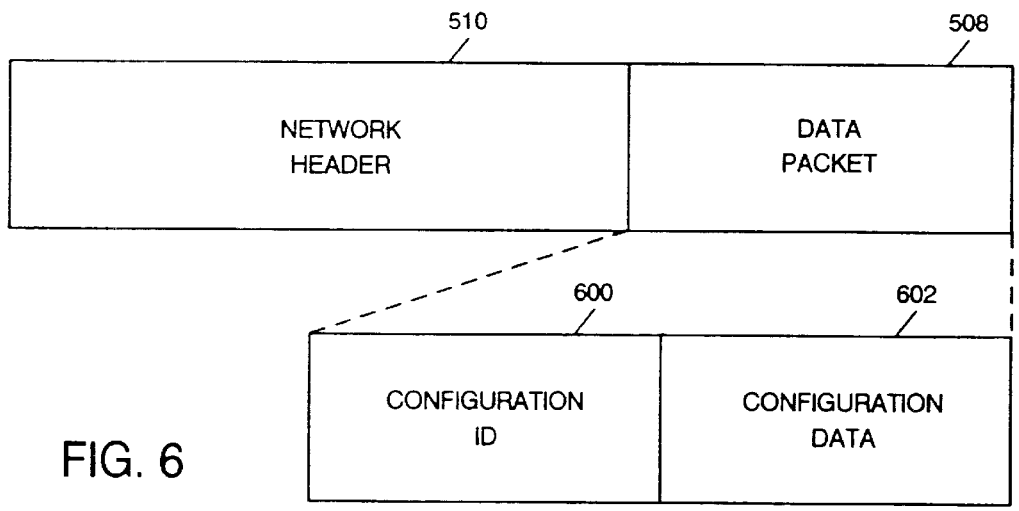
FIG. 6 is a diagrammatic representation of the data area from FIG. 5 with details for reception according to the principles of the present invention.
Figure 5:
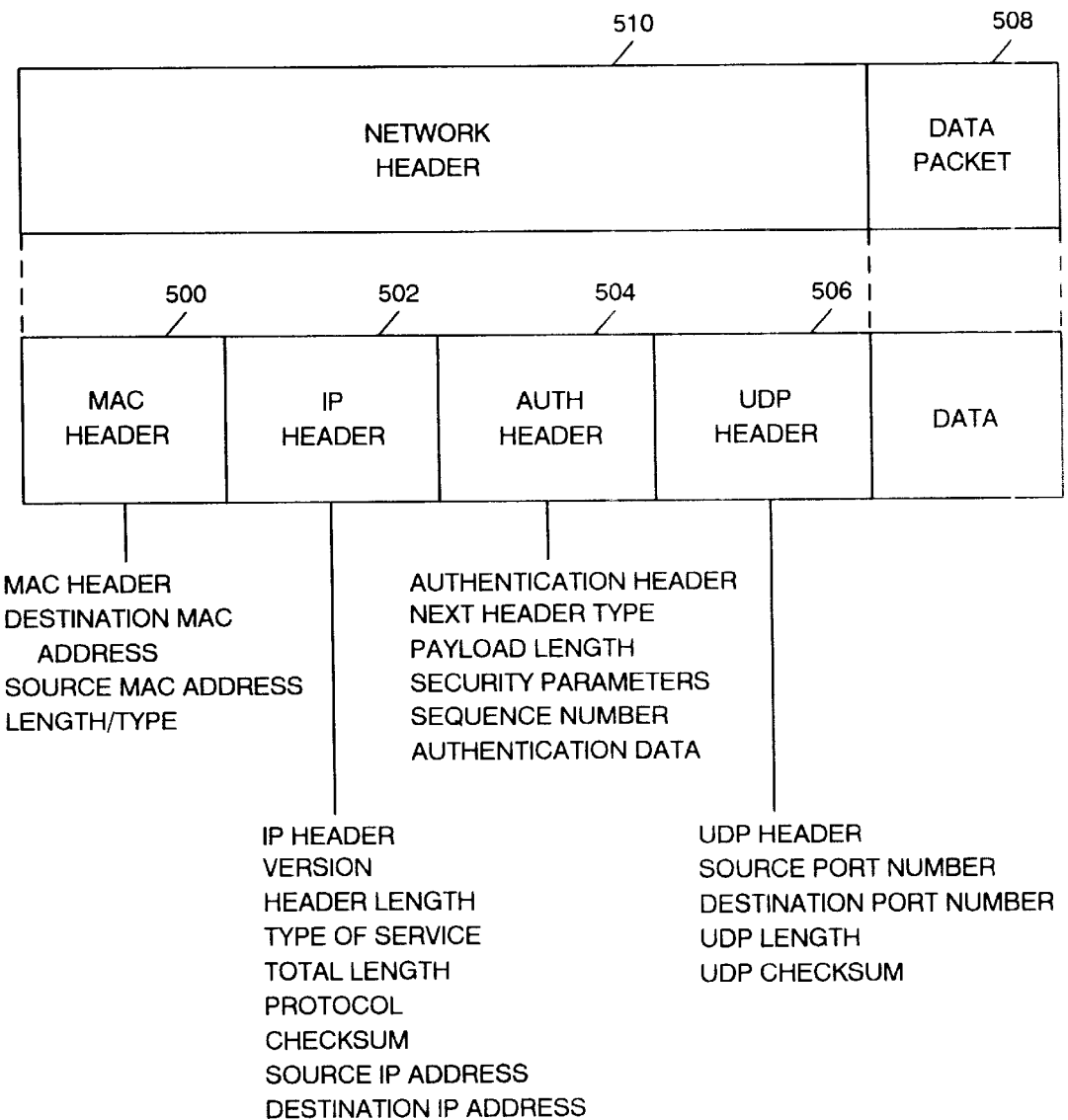
FIG. 5 is a diagrammatic representation of an exemplary packet of a LAN system based on an Ethernet specification.

A standard packet including a network header and data packet, as might be sent over an Ethernet network, is indicated in FIG. 5. The network header 510 includes a MAC header 500, an IP header 502, Authentication header 504, and UDP header 506, and is known to provide addresses, identifiers and other information for assuring correct transfer. The data packet 508 includes the information content to be transferred. For reception, the straight Magic Packet or Configuration ID 600 has, as shown in FIG. 6, content known as 6 bytes of FFh followed by 12 copies of client MAC address. With the special extensions, Configuration ID 600 and Configuration Data 602, the network manager 100 may send commands to logic module 300. Logic module 300 in system 104 determines if the command is directed to that client. For the present embodiment with a simplified description, the command is limited to a change in IP address or network address of the management console 100.

For the reception of packets received by logic module 300, the data patterns, according to the principles of the present invention, indicated in FIG. 6 are preferably followed. The data field is checked for configuration packet by determining if it contains Configuration ID, which consists of UUID and Old Servers IP, MAC, and UDP Port. The data field of Configuration Data 602 contains the information required for the update, such as System key, Group Key, New Server IP, New Server MAC, and New UDP Port. The field could contain the new values. The micro controller 402 in logic 300 transfers the contents of the new header to the non-volatile storage or EEPROM 302.

As hereinbefore stated, the data portion of the Data Packet 508 contains two areas of data. In the preferred embodiment, the first field is the Configuration ID field 600 of FIG. 6. The Configuration ID 600 field contains the UUID of the client machine for the current, old, or existing management server's network address which consists of IP, MAC, and UDP port assignment. The micro controller 402 inspects that data and compares it against the values stored in EEPROM 302 to ensure a match between the information in Configuration ID 600 and the current management server.

When a match occurs, the micro controller 402 inspects the data contents of configuration data 602 to the command applied to client 104. Even though the management server 100 sends a command to all clients on the network, the command may only be intended for a group of clients. This is handled by two additional match fields, the system key and the group key. The system and group keys are "pseudo passwords" for client 104 for addressing the machine uniquely or as part of a group of systems. If a match occurs the micro controller 402 takes the new values for the management server 100 (IP, MAC, and UDP port) from configuration data 602 and updates EEPROM 302.

| Bytes (Hex) | Description |
| --- | --- |
| 1–29 | <Ethernet/IP/UDP Headers> |
| 2A–2F | Old Server MAC Address |
| 30–33 | Old Server IP Address |
| 34–39 | New Server MAC Address |
| 3A–3D | New Server IP Address. |
| 3E–3F | New Server UDP Port |

Another option for updating is the use of authentication keys. During the initial configuration or roll out, the Alert on LAN is setup with two Authentication Keys. The first key is unique to each machine and the second key is typically set the same for a group of systems which could, for example, be in the same building, on the same floor, serving the same function, etc.) This provides the flexibility to modify the IP address on an individual client basis or as a group of clients. The packet contains these keys and the new server addresses. The hardware will compare the authentication keys sent from the server to the keys located in the Alert On LAN EEPROM. When updating an individual machine, the group key is left blank, and when updating a group of machines, the individual machine key is left blank. Using Authentication Keys, the packet format can be implemented as follows, for example, for an Ethernet packet:

| Bytes (Hex) | Description |
| --- | --- |
| 1–29 | <Ethernet/IP/UDP Headers> |
| 30–3F | Authentication key (for individual) |
| 40–4F | Authentication key (for group) |
| 50–55 | New Server MAC Address |
| 56–59 | New Server IP Address. |
| 5A–5B | New Server UDP |

Security for either option for updating can be implemented using a TCP/IP Authentication Header (AH) or an Encapsulating Security Payload (ESP) Header detailed in RFC 1825. The management ASIC would also be equipped to interpret the Header and decode the data.

Figure 7:
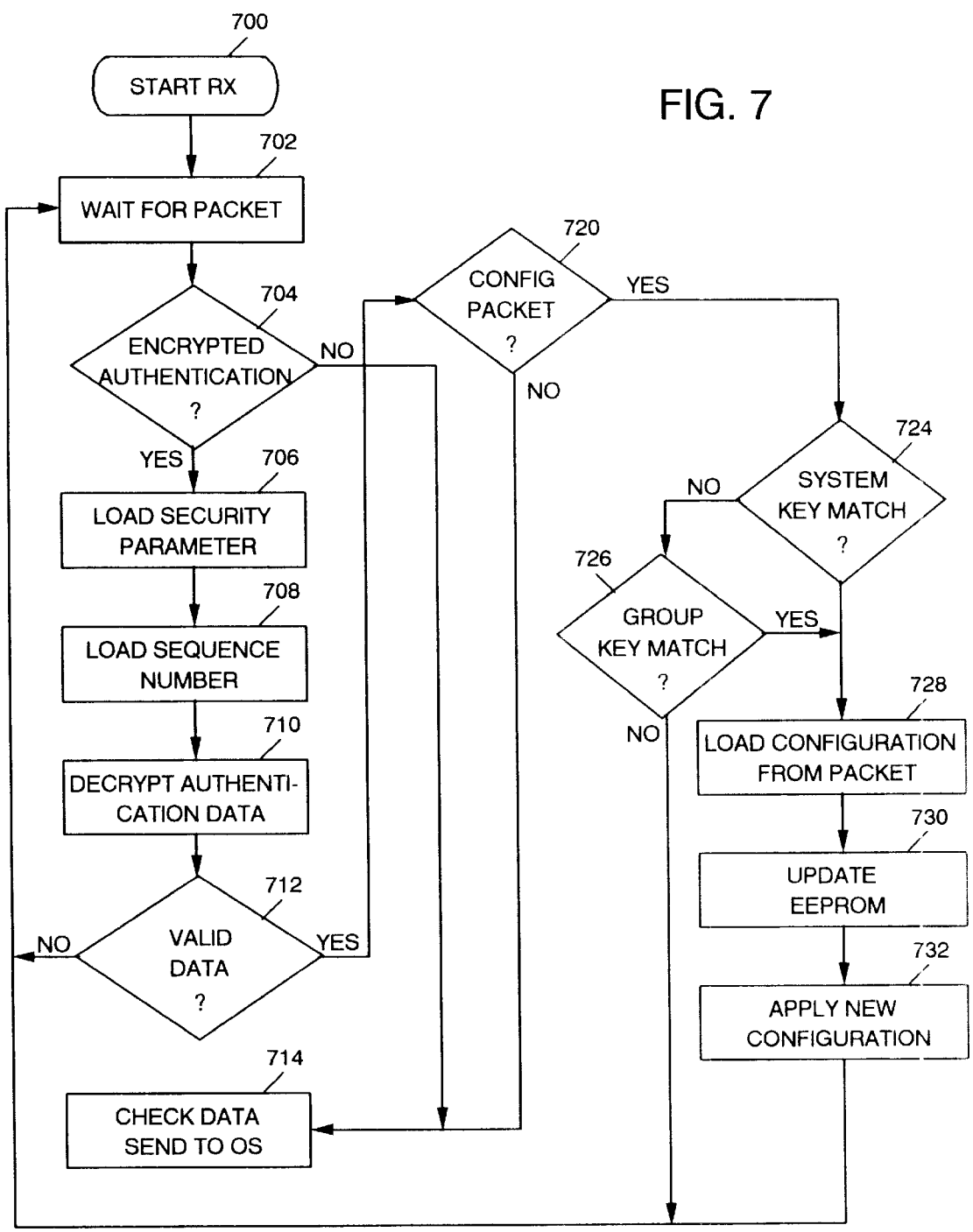
FIG. 7 is a flow chart indicating logic for generation of the transmitted data packets of FIG. 5 which may be implemented as hard logic or by using a programmed general purpose processor.

Referring to FIG. 7, there is illustrated the process, starting at step 700, used by micro controller 402 in implementing attributes of the invention. The micro controller 402, at step 702, waits for a packet and upon receiving one, at step 704, checks to determine authentication of encrypted data in the packet. Only authenticated packets are used to change management server parameters to eliminate concern of an unauthorized user or hacker entering or damaging the network. Non authenticated packets are assumed to be data and sent to OS at step 714. Packets authenticated at steps 706, 708 and 710, are then checked to determine if they contain valid data at step 712. For authentication, first the security load parameter is done at step 706 and the sequence number is loaded at step 708. The next measure, at step 710, is decrypting the authenticated packet. Once authentication is complete, at step 712, invalid data is ignored and valid data is checked for a configuration packet at step 720.

Configuration packets are determined by checking for Configuration ID 600 and Configuration Data 602. If the packet is not a configuration packet, the packet is assumed to be an encrypted data packet and the data is sent to OS at step 714. Configuration packets are checked for a system key match at step 724 and for a group key match at step 726. If a system key match is confirmed at step 724, the steps of 728, 729 and 730 follow. If no system key match is found then at step 726 a check is made for a group key match. If a group key match is confirmed than the exemplary steps of 728, 730 and 732 are carried out for the group of the client systems. The system key and group key are contained in EEPROM 302. If a match is found, then new configuration data (Server IP, MAC, Port) are pulled from the Configuration Data packet 602 at step 728, as stated. The EEPROM is updated at step 730 and then the new configuration is applied at step 732.

The invention has been described with reference to preferred implementations thereof, but it will be appreciated that variations and modifications within the scope of the claimed invention will be suggested to those skilled in the art. For example, the invention may be implemented on networks other than Ethernet networks such as token ring networks or used to control other aspects of a system.

What is claimed is:

1. A personal computer client system, for a data network including at least one personal computer client system and a server having an internet protocol destination address, comprising:
   a central processing unit (CPU);
   memory;
   a non-volatile memory storage device for storing the destination address of the server; and
   a network adapter with a reception portion connected to the data network for receiving network packet signals on the data network from the server in a predefined analog format and decoding the network packet signals having the internet protocol address of the server to a digital format and providing the internet protocol address of the server to the memory storage device to store the destination address of the server.

2. The personal computer client system according to claim 1, wherein the data network conforms to the Ethernet specification and the network packet signals on the network are digitally encoded analog signals.

3. The personal computer client system according to claim 1, further including auxiliary logic as a part of the network adapter for applying network packet signals periodically to indicate selected state information regarding the personal computer client system.

4. The personal computer client system according to claim 1, further including auxiliary logic as a part of the network adaptor and electrically connected to be powered and active during a state of less than full power being provided to the CPU of the personal computer client system to detect network packet signals received by the personal computer client system that has data including the server's internet protocol destination address.

5. The personal computer client system according to claim 4, wherein the network adaptor provides the data including the server's internet protocol destination address to the memory storage device for storing the data.

6. The personal computer client system according to claim 1, wherein the network adaptor includes a physical layer connected to the data network for receiving and transmitting network data packets to and from the server on the network side of the physical layer and for transmission of received network data packets, including data related to the server's internet protocol destination address, on the client side of the physical layer on a media independent interface bus to an auxiliary logic as a part of the network adaptor to detect network data packets received by the personal computer client system that have data including the server's internet protocol destination address.

7. The personal computer client system according to claim 6, further including a non-volatile storage device for storing data including the server's internet protocol destination address.

8. The personal computer client system according to claim 7, wherein the auxiliary logic includes a micro controller having state machines for managing data packet reception, data packet transmission and non-volatile storage device transmission.

9. The personal computer client system according to claim 8, further including in the personal computer client system a PCI bus, an ISA bus, a PCI/ISA bridge, and wherein the micro controller has a state machine for managing bus transmission between the network adaptor and the PCI bus and the ISA bus.

10. A personal computer client system, for a data network including at least one personal computer client system and a server, having an internet protocol destination address, connected to each other through a network communication system, comprising:
    a central processing unit (CPU);
    memory;
    a memory controller connecting the memory to the CPU;
    a PCI bus;
    a PCI bridge connecting the PCI bus to the memory controller and the CPU;
    an ISA bus;
    a PCI/ISA bridge connecting the ISA bus to the PCI bus;
    a power management device connected to a power supply device;
    a network adapter connected to the PCI bus and the network communication system;
    a physical layer as a part of the network adapter connected to the network communication system to receive network packet signals from the server;
    a media access controller as a part of the network adapter connected to the PCI bus;
    a media independent interface (MII) bus connected to the physical layer and the media access controller;
    an EEPROM for storing the destination address of the server; and
    a logic module connected to the EEPROM and to the MII bus for receiving and detecting network packet signals having data related to the internet protocol destination address of the server and providing the data related to the internet protocol address of the server to the EEPROM to store the destination address of the server.

11. A personal computer client system, for a local area network (LAN) including at least one personal computer client system and a server having an internet protocol destination address, comprising:
    a central processing unit (CPU);

memory;

a non-volatile memory storage device for storing the destination address of the server; and a network adaptor with a reception portion connected to the data network for receiving network packet signals on the data network from the server in a predefined analog format and decoding the network packet signals having the internet protocol address of the server to a digital format and providing the internet protocol address of the server to the memory storage device to store the destination address of the server.

12. The personal computer client system according to claim 11, further including auxiliary logic as a part of the network adaptor for applying network packet signals periodically to indicate selected state information regarding the personal computer client system.

13. The personal computer client system according to claim 11, further including auxiliary logic as a part of the network adaptor and electrically connected to be powered and active during a state of less than full power being provided to the CPU of the personal computer client system to detect network packet signals received by the personal computer client system that has data including the servers internet protocol destination address.

14. The personal computer client system according to claim 11, wherein the network adaptor includes a physical layer connected to the LAN network for receiving and transmitting network data packets to and from the server on the network side of the physical layer and for transmission of received network data packets, including data related to the server's Internet protocol destination address, on the client side of the physical layer on a media independent interface bus to an auxiliary logic as a part of the network adaptor to detect network data packets received by the personal computer client system that have data including the server's internet protocol destination address.

* * * * *